United States Patent
Bradshaw et al.

[11] 3,877,141
[45] Apr. 15, 1975

[54] METHOD FOR MAKING BRAKE SHOES

[75] Inventors: Harry Bradshaw, Newport News, Va.; Hunter R. McKenney, Prattville, Ala.; Roland W. McKenzie, Culpeper, Va.

[73] Assignee: Standard Forge and Axle Company Incorporated, Montgomery, Ala.

[22] Filed: July 5, 1974

[21] Appl. No.: 486,671

Related U.S. Application Data

[60] Continuation of Ser. No. 366,039, June 1, 1973, abandoned, which is a division of Ser. No. 174,634, Aug. 25, 1971, Pat. No. 3,753,460.

[52] U.S. Cl. .............. 29/527.5; 148/2; 148/3; 188/257; 188/258
[51] Int. Cl. ............................................. B23p 17/04
[58] Field of Search ............ 29/527.5, 527.6; 148/2, 148/3; 164/29, 30, 131, 132, 364, 365; 188/255, 257, 258

[56] References Cited
UNITED STATES PATENTS

| | | | |
|---|---|---|---|
| 1,638,759 | 8/1927 | Cobb | 188/255 X |
| 1,954,665 | 4/1934 | Dake | 148/2 |
| 2,316,280 | 4/1943 | Osbrink | 164/364 X |
| 3,101,533 | 8/1963 | Rossbach | 29/527.5 X |
| 3,373,484 | 3/1968 | Larson et al. | 29/527.6 X |

FOREIGN PATENTS OR APPLICATIONS

| | | | |
|---|---|---|---|
| 17,009 | 7/1911 | United Kingdom | 188/258 |

Primary Examiner—C. W. Lanham
Assistant Examiner—D. C. Reiley, III
Attorney, Agent, or Firm—Mason, Fenwick & Lawrence

[57] ABSTRACT

A method of making a brake shoe having a curved table section and at least one rib section disposed on the concave side of the table section, generally including casting the brake shoe in a mold having cope and drag sections so that the axis of curvature of the table section thereof is disposed substantially parallel to the parting plane of the mold sections whereby no draft or parting ridge is formed on the outer curved surface of the table section.

8 Claims, 5 Drawing Figures

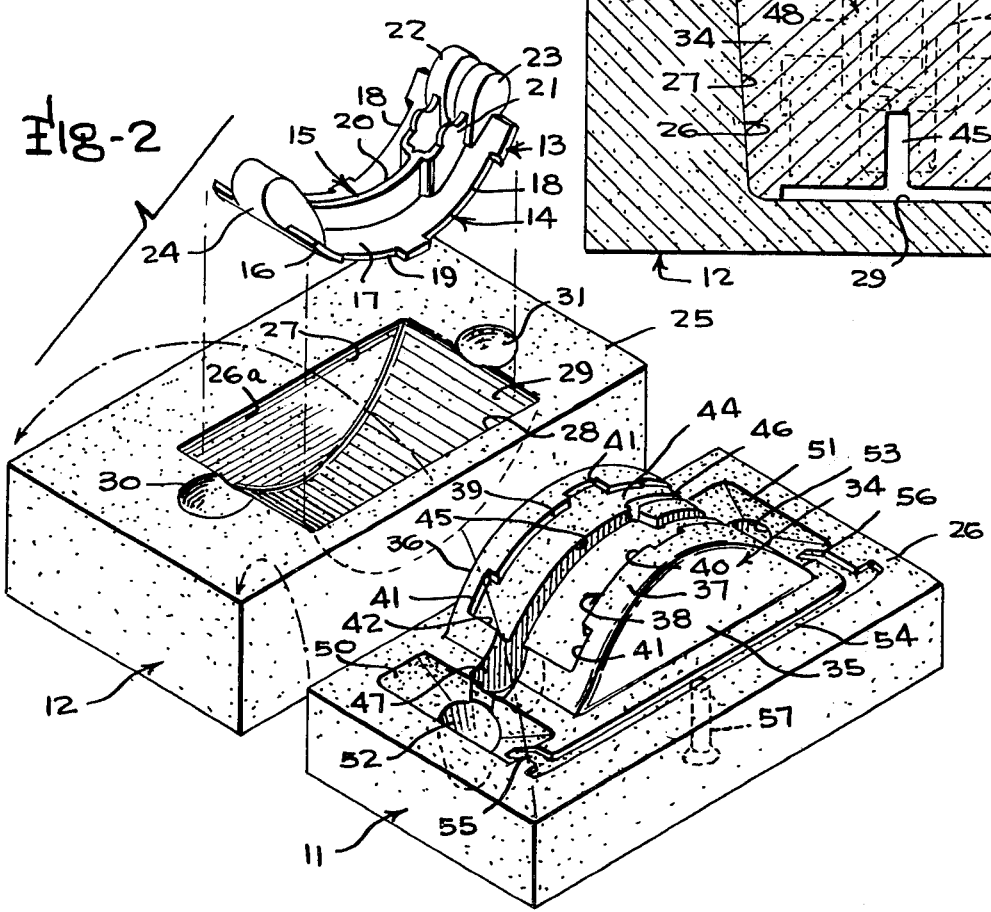

METHOD FOR MAKING BRAKE SHOES

This is a continuation of application Ser. No. 366,039, filed June 1, 1973, now abandoned, which is a division of Ser. No. 174,634, filed Aug. 25, 1971, now U.S. Pat. No. 3,753,460.

The present invention relates to the brake shoe art, and more particularly to a method of making a brake shoe. The invention further contemplates a novel method of casting a brake shoe which reduces production time and cost.

Conventional brake shoes commonly used in brake assemblies for automotive vehicle and trailers, generally consist of a curved table section and at least one rib section disposed on the concave side of the curved table section. Usually, a brake lining is secured by rivets, bolts or other suitable fasteners on the outer curved surface of the table section, which is engageable with a brake drum to provide a braking action. In addition, one end of the rib section is provided with an opening for pivotally mounting the lower end of the brake shoe on an anchor pin rigidly secured on the lower end of a brake spider of the brake assembly, the opposite end of the rib section is provided with an opening for receiving therein the shaft of a roller engageable with an actuating cam for pivoting the brake shoe about the anchor pin and moving the brake lining thereof into engagement with the brake drum, and an opening is provided in the rib section intermediate the ends thereof to which there is connected a spring interconnecting a pair of brake shoes to bias them out of braking engagement with the brake drum.

In the prior art, it has been the conventional practice to make brake shoes either by fabricating the brake shoes from stamped table and rib components, or by casting the brake shoes as integral units. In the latter method of making brake shoes, it further has been the conventional practice of the prior art to cast the brake shoes, malleableize or anneal the cast brake shoes advantageously alter the microstructure and obtain the desired mechanical properties, machining the outer curved surface of the table section for mounting the brake lining, and drilling appropriate holes in the table and rib sections for mounting the brake lining, and mounting and operatively connecting the brake shoe in a brake assembly. The machining of the outer curved surface of the table section has been necessary as a result of the fact that conventional brake shoes have been formed by casting the brake shoes with the table sections thereof disposed vertically. In order to obtain satisfactory castings by following such a casting procedure, it was necessary in the prior art to provide draft in the mold cavities to allow the pattern to be removed from the molding material. Such practice resulted in a brake shoe casting wherein the outer curved surface of the table section thereof was provided with a draft and also a parting ridge formed by virtue of the mold cavity for the table section of the brake shoe being disposed in both the cope and drag sections of the mold assembly.

The necessity of providing draft in the mold cavities for the table section of cast brake shoes and the necessity of forming the mold cavity for the table section of the brake shoe in both the cope and drag sections of the mold assembly, results in a cast brake shoe having an unfinished outer surface on the table section thereof, thereby further necessitating an additional machining operation to provide a finished curved surface of appropriate size and dimension for mounting the brake lining on the table section of the brake shoe. It thus was found desirable to provide a method of making a cast brake shoe wherein the outer surface of the table section thereof could be cast to the appropriate dimension thereby eliminating a machining operation to finish such surface and permitting the mounting of a brake lining on the cast outer surface of the table section.

Accordingly, it is the principal object of the present invention to provide a novel method of making a brake shoe.

Another object of the present invention is to provide a novel method for making a cast brake shoe.

A further object of the present invention is to provide a method of making a cast brake shoe having a curved table section and at least one rib section disposed on the concave side of the table section wherein a brake lining may be mounted directly on the outer cast surface of the table section of the brake shoe.

A still further object of the present invention is to provide a novel method of making a cast brake shoe having a curved table section and at least one rib section disposed on the concave side of the table section wherein the outer curved surface of the table section is cast to its final size and dimension thereby eliminating the necessity of machining such surface to its final dimension.

Another object of the present invention is to provide a novel method of casting a brake shoe.

A further object of the present invention is to provide a novel method of casting a brake shoe having a curved table section and at least one rib section disposed on the concave side of the table section wherein the outer curved surface of the table section is cast to a desired final dimension.

A still further object of the present invention is to provide a novel method of casting a brake shoe having a curved table section and at least one rib section disposed on the concave side of a table section wherein excess metal in the form of draft or a parting ridge on the outer surface of the table section is eliminated.

Another object of the present invention is to provide a method of making a cast brake shoe economically.

A still further object of the present invention is to provide a cast brake shoe made by a novel method.

Other objects and advantages of the present invention will become more apparent to those persons having ordinary skill in the art to which the present invention pertains, from the following description taken in conjunction with the accompanying drawings wherein:

FIG. 1 is a perspective view of a mold assembly for casting a brake shoe utilizing the present invention;

FIG. 2 is a perspective view similar to FIG. 1, having the cope and drag sections of the assembly separated to illustrate the mold cavities in each of the sections;

FIG. 5 is a cross-sectional view taken along line 5—5 in FIG. 4.

Figure 3:
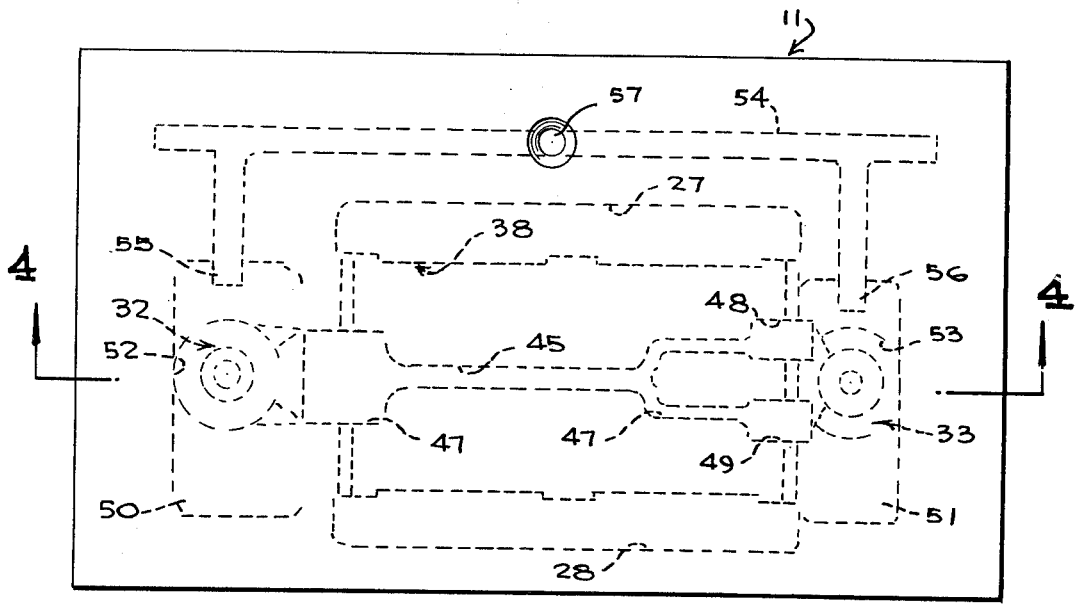
FIG. 3 is an enlarged top plan view of the mold assembly illustrated in FIGS. 1 and 2.

Briefly described, the present invention generally relates to a method of making a brake shoe having a curved table section and at least one rib section, including casting the brake shoe in a mold having cope and drag sections so that the axis of curvature of the table section thereof is disposed substantially parallel to the parting place of the mold curtain whereby no draft or parting ridge is formed on the outer curved surface of the table section, and then heat treating the cast brake shoe. Preferably, in the casting of the brake shoe, the mold cavity for the table section thereof is provided entirely in either the cope or drag section of the mold assembly, and, in the heat treatment of the finished casting, the brake shoe is heated to a temperature sufficient to alter the microstructure and obtain desired mechanical properties.

Referring to the drawings, there is illustrated a mold assembly 10 including a cope section 11 and drag section 12 having complementary mold cavities which cooperate when the cope and drag sections are mated to provide a mold cavity for casting a brake shoe 13. The brake shoe consists of a curved table section 14 and a rib section 15 disposed on the concave side of the table section 14 and formed integral therewith. The table section 14 is provided with a curved outer surface 16, a substantially parallel inner curved surface 17 and recesses 18 and 19 formed along the side edges thereof. The rib member 15 consists of a longitudinal portion 20 having a bifurcated end 21 terminating with a pair of bosses 22 and 23 which project beyond the end of the table section 14, and having a boss 24 disposed at the opposite end thereof, projecting beyond the opposite end of the table section 14.

Figure 4:
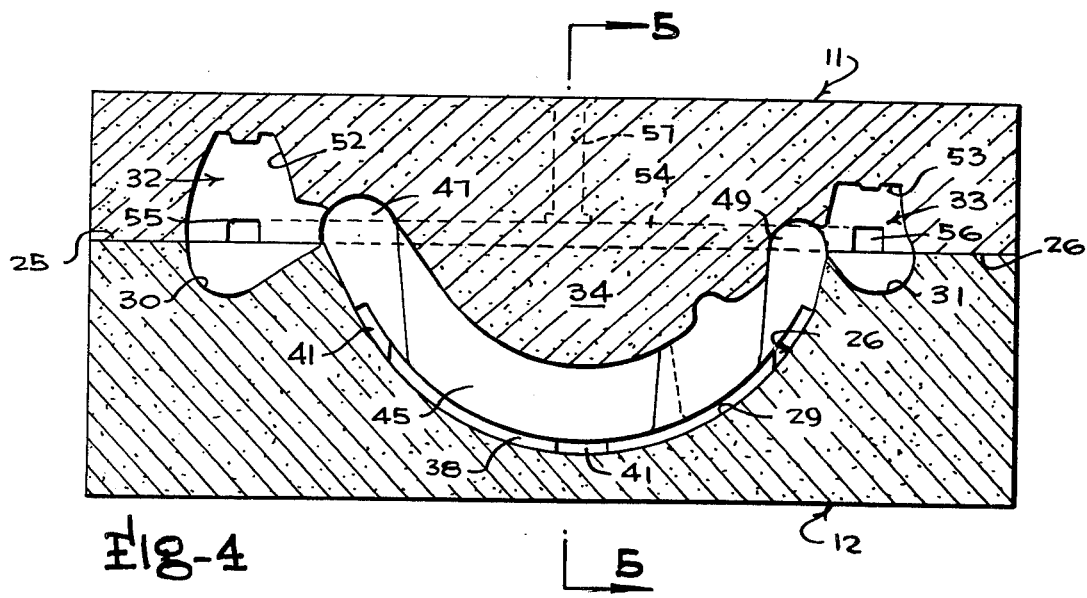
FIG. 4 is a cross-sectional view taken along line 4—4 in FIG. 3.

The cope section 11 and drag section 12 consist of a compacted sand molding material, and are provided with mating surfaces 25 and 26, as best illustrated in FIG. 2. Formed in the drag section 12 is a recess 26a provided with a pair of parallel sidewalls 27 and 28 and a bottom, curved wall 29 having the same configuration as the configuration of the outer surface 16 of brake shoe 15. As best illustrated in FIG. 4, the longitudinal dimension of the bottom curved wall 29 is greater than the longitudinal dimension of the outer surface 16 of the brake shoe, so that the entire forming wall for the outer surface 16 of the brake shoe will be disposed entirely in the drag section 21 and below the mating surface 25 of the drag section. Also formed in the drag section 21 are a pair of recesses 30 and 31 disposed at the ends of the bottom curved wall 29 which constitute the lower portions of the riser cavities 32 and 33 as shown in FIG. 4.

The axis of curvature or a transverse line lying in the bottom, curved wall 29 is disposed parallel to the parting plane of the cope and drag sections of the mold assembly, which coincide with the mating surface 25 and 26, when engaged.

The cope section 11 is provided with a downwardly projecting portion 34 adapted to be received within the recess 26a when the surfaces 25 and 26 engage. The projecting portion 34 includes a pair of sidewalls 35 and 36 which have the same configuration and engage the sidewalls 27 and 28 of recess 26, and a curved bottom wall 37 having the same configuration and engaging the bottom wall 29 of recess 26a, when the cope section 11 is positioned on the drag section 12.

Formed in the curved bottom wall 37 of projecting portion 35, is a shallow, rectangularly-shaped recess 38 which cooperates with the bottom wall 29 of recess 26a to form the mold cavity for the table section 14 of brake shoe 15. The recess 38 is provided with a pair of parallel sidewalls 39 and 40 provided with recessed portions 41, a pair of end walls 42 and 43, and a curved bottom wall 44. Also formed in the bottom wall 44 is a longitudinally disposed recess 45 providing a mold cavity for forming the longitudinal portion 20 of rib section 15, and an adjoining bifurcated recess 46 providing a mold cavity for forming the bifurcated portion 21 of rib section 15.

Communicating with the shallow recess 38 and the longitudinal recess 45, is a recess 47 formed in the curved surface 37 and mating surface 26 which cooperates with the curved bottom wall 29 of recess 26a to form the mold cavity for the boss 24 of the brake shoe. Similarly, a pair of recesses 48 and 49 are formed in the surfaces 37 and 26 which communicate with the bifurcated recess 46 and cooperate with the curved wall 29 of recess 26a for forming mold cavities for bosses 22 and 23 of the brake shoe.

Formed in the surface 26 of the cope section and communicating with the recesses 47, and recesses 48 and 49, respectively, are a pair of shallow recesses 50 and 51. The shallow recesses are provided with deeper recessed portions 52 and 53 which cooperate with recesses 30 and 31 in the drag section 12 to form riser cavities 32 and 33. As best shown in FIG. 4, the depth of recessed portions 52 and 53 are greater than the depths of recess 47, and recesses 48 and 49, respectively, to insure a sound casting. Also formed on the mating surface 26 is a recess forming a runner 54 communicating at opposite ends thereof through gates 55 and 56 with shallow recesses 50 and 51, and the riser cavities 32 and 33. Molten metal is poured into the mold through a sprue 57 having a pour basin 58 and communicating with the runner intermediate the ends thereof.

In making a brake shoe 15 by utilizing the present invention, appropriate patterns and frames are used to form the cope section 11 and drag section 12 with the various mold cavities therein as described. Preferably, the patterns will be constructed of a suitable metal and sand molding material will be used which will be compacted about the patterns for forming the mold cavities in the cope and drag sections of the mold assembly. After the mold sections have been formed, the cope section 11 is placed on the drag section 12 so that the projecting portion 34 is received within the recess 26a and the mating surfaces 25 and 26 engage to form the mold cavity for a brake shoe 15.

With the mold assembly thus assembled, hot metal, preferably malleable or ductile iron, is poured into the sprue 57 to fill the mold cavity. The molten metal will flow through the runner 54 and gates 55 and 56 into the riser cavities 32 and 33. As the level of molten metal rises in cavities 32 and 33, it will flow into the mold cavity for the brake shoe, first forming the table section 14 and then the rib section 15.

As best illustrated in FIG. 4, all surfaces of the mold cavity disposed substantially perpendicular to the mating surfaces 25 and 26 are provided with draft to readily permit the removal of the pattern from the mold. Due to the fact that the table forming section of the mold cavity is disposed transversely relative to the sides of the mold and entirely within the drag section 12, no parting line passes through any portion of the bottom wall 29 forming a molding wall for the outer surface 16 of the table section of the brake shoe.

After the molten metal has solidified, the casting is removed from the mold assembly, allowed to cool and then cleaned by removing the gates and risers connected to the brake shoe casting. The cleaned casting then is heat treated, and finally sized by straightening or coining.

Brake shoes may be cast by the method as described from any suitable metal including malleable iron, ductile iron, steel, aluminum and cast iron. It is preferred, however, that such shoes be cast of either malleable or ductile iron which are more ideally suited for brake shoes due to their advantageous mechanical properties, castability and machinability.

The heat treatment of the brake shoes would depend upon the particular metal used. Ductile iron would be annealed to obtain a ferritic matrix which has the maximum elongation, toughness and machinability. The annealing heat treatment for ductile iron can be of two types: Subcritical annealing or austenitizing annealing. Subcritical annealing consists of heating the ductile iron to a temperature just below the lower critical temperature of the metal, approximately 1,350°F, and then slowly cooling the casting at a rate sufficient for decomposition of the pearlite in the metal. Such type of heat treatment is possible when no free carbides are present in the matrix. Austenitizing annealing would be necessary when free carbides are present in the matrix. Such heat treatment would consist of heating the casting to the austenitizing temperature, approximately 1,650°F, and then holding such temperature to decompose the free carbides. After the carbides have been decomposed, the casting would be cooled to a temperature below the lower critical temperature at a rate sufficiently slow to insure the formation of ferrite.

Castings made of malleable iron would be subjected to a heat treatment essentially the same as the austenitizing anneal used for ductile iron. The principal difference between annealing ductile iron and malleable iron consists of the duration of heat treatment. Ductile iron can be annealed in a matter of hours whereas malleable iron usually requires days to obtain a ferritic matrix.

Brake shoes for heavy duty application can be made of cast steel. Cast steel has better mechanical properties than either ductile or malleable iron, and is annealed by heating into the austenitizing temperature ranges and then allowing the casting to cool in the furnace. Aluminum alloys also can be used as brake shoe material for light duty applications. The use of aluminum would be predicated on economic considerations, such as castability and machinability, both of which properties are outstanding in aluminum alloys. To obtain maximum mechanical properties, aluminum alloys would require solution heat treatment and age hardening. Solution heat treatment would consist of heating the casting to approximately 900°F, holding the casting at such an elevated temperature for a suitable period of time, and then rapidly cooling the casting, usually by quenching in water. Age hardening consists of heating the quenched casting to a temperature of approximately 300°F to 400°F to allow the precipitation of the hardening phases. The specific temperature required would depend upon the type of alloy used.

Under special conditions brake shoe castings may be formed of cast iron. The application of such shoes would be restricted to relatively slow moving equipment such as cranes. The selection of such a material would be predicated on machinability, castability and cost. Normally, cast iron brake shoes would not receive any heat treatment.

The brake shoe may then be completed by drilling a transverse hole in the boss 24 to receive a bushing therein for mounting the brake shoe on an anchor pin of a brake assembly, drilling aligned transverse holes in bosses 22 and 23 to receive bushings for mounting a roller shaft, drilling a hole in the longitudinal portion 20 of the rib section to interconnect the brake shoe with a similar brake shoe in a brake assembly, with a spring functioning to bias the brake shoes out of braking engagement with a brake drum, drilling holes along the table section 14, and mounting a brake lining on the outer curved surface 16 thereof by means of rivets, bolts or other suitable fasteners.

It will be appreciated that by casting the table section 16 of the brake shoe so that no draft or parting line is provided on the outer curved surface of the table section, the brake lining may be mounted directly on the cast surface 16 thus eliminating the machining of the outer surface of the table section. The elimination of such machining operation significantly reduces the production time and cost of cast brake shoes of the type described.

From the foregoing detailed description, it will be evident that there are a number of changes, adaptations and modifications of the present invention which will come within the province of those persons having ordinary skill in the art. However, it is intended that all such variations not departing from the spirit of the invention be considered as within the scope thereof as limited solely by the appended claims.

We claim:

1. A method of making a brake shoe having a curved table section provided with a continuous arcuate surface suitable for mounting a brake lining directly thereon, and at least one rib section disposed on the concave side thereof, comprising forming a cavity having the desired configuration of said brake shoe and cooperating sprue, runner and riser cavities in at least one of the cope and drag sections of a casting mold so that the surface of the cavity portion adapted to form the outer surface of the table section of said brake shoe is provided in only one of said cope and drag sections and the axis of curvature of the surface of said cavity portion adapted of said brake shoe is disposed substantially parallel to the parting line of said cope and drag sections, pouring molten metal through said sprue and runner into said mold cavities, removing the cast brake shoe from the mold assembly after the molten metal has cooled, cleaning the casting and heat treating the cleaned cast brake shoe.

2. A method of making a brake shoe according to claim 1 including casting the brake shoe in malleable iron and heat treating by malleableizing.

3. A method of making a brake shoe according to claim 1 including casting the brake shoe in ductile iron and heat treating by annealing.

4. A method of making a brake shoe according to claim 1 including straightening said cast brake shoe subsequent to heat treating.

5. A method of making a brake shoe according to claim 1 including coining said cast brake shoes subsequent to heat treating.

6. A method of making a brake shoe according to claim 1 including machining the rib section of said cast brake shoe to accomodate operatively connected components of a brake assembly, and drilling holes in the table section of said cast brake shoe for receiving fasteners therethrough for securing a brake lining to the outer continuous arcuate surface of said table section.

7. A method of making a brake shoe according to claim 1 including straightening the heat treated brake shoe in a press, drilling holes in said rib section for receiving therein an anchor pin and a cam roller shaft, and drilling holes in said table section for receiving fasteners therethrough for securing a brake lining to the outer continuous arcuate surface of said table section.

8. A method of making a brake shoe having a curved table section provided with a continuous arcuate surface suitable for mounting a brake lining directly thereon, and at least one rib section disposed on the concave side thereof having end portions projecting beyond the ends of said table section, comprising forming a cavity having the desired configuration of said brake shoe and cooperating sprue, runner and riser cavities in at least one of the cope and drag sections of a casting mold so that the surfaces of the cavity portions adapted to form the outer surface of the table section and the outer surfaces of the ends of said rib section projecting beyond the ends of said table section, are provided in only one of said cope and drag sections and the axis of curvature of the surface of said cavity portion adapted to form said continuous arcuate surface of the table section of said brake shoe is disposed substantially parallel to the parting plane of said cope and drag sections, pouring molten metal through said sprue and runner into said mold cavities, removing the cast brake shoe from the mold assembly after the molten metal has cooled, cleaning the cast brake shoe and heat treating the cleaned cast brake shoe.

* * * * *